US006346702B1

(12) United States Patent
Davis et al.

(10) Patent No.: US 6,346,702 B1
(45) Date of Patent: Feb. 12, 2002

(54) FIBER BRAGG GRATING PEAK DETECTION SYSTEM AND METHOD

(75) Inventors: Michael A. Davis, Glastonbury; David R. Fournier, Ashford; David G. Bellemore, Woodbury; William M. Stielau, Middletown, all of CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/458,911

(22) Filed: Dec. 10, 1999

(51) Int. Cl.[7] .............................. G01J 1/04; G01J 1/42; G01J 5/08; G02B 6/00
(52) U.S. Cl. .................................... 250/227.14; 385/12
(58) Field of Search ...................... 250/227.14; 385/10, 385/12, 37; 356/32, 35.5, 477, 478, 479

(56) References Cited

U.S. PATENT DOCUMENTS

| 4,315,413 | A |   | 2/1982  | Baker        |            |
|-----------|---|---|---------|--------------|------------|
| 4,488,823 | A |   | 12/1984 | Baker        |            |
| 5,042,898 | A |   | 8/1991  | Morey et al. |            |
| 5,291,013 | A | * | 3/1994  | Nafarrate et al. | 250/227.14 |
| 5,361,130 | A |   | 11/1994 | Kersey et al.|            |
| 5,469,520 | A |   | 11/1995 | Morey et al. |            |
| 5,691,999 | A |   | 11/1997 | Ball et al.  |            |
| 5,818,585 | A |   | 10/1998 | Davis et al. |            |

FOREIGN PATENT DOCUMENTS

EP           415401 A    3/1991

OTHER PUBLICATIONS

"Applications of Optical Fiber Bragg Grating Sensors for the Seismic Industry" printed by CiDRA Corp., May 1998, pp 1–12.

* cited by examiner

*Primary Examiner*—Stephone B. Allen
*Assistant Examiner*—Eric Spears
(74) *Attorney, Agent, or Firm*—Ware, Fressola, Van Der Sluys & Adolphson LLP

(57) ABSTRACT

A fiber Bragg grating peak detection system has a broadband source that provides a broadband optical signal, a fiber Bragg grating and a variable threshold and/or grating profile peak detection unit. The fiber Bragg grating responds to the broadband optical signal, and further responds to a physical parameter, for providing a fiber Bragg grating optical signal containing information about the physical parameter. The variable threshold or grating profile peak detection unit responds to the fiber Bragg grating optical signal, for providing a variable threshold or grating profile peak detection unit signal containing information about a peak detected in the fiber Bragg grating optical signal that is used to determine the physical parameter. The variable threshold or grating profile peak detection unit detects the peak using either a variable threshold peak detection or a grating profile peak detection, or a combination thereof. During the variable threshold peak detection, the variable threshold or grating profile peak detection unit determines a respective local threshold value for each wavelength over a spectral band of the fiber Bragg grating optical signal. During the grating profile peak detection, the detection unit determines a grating profile on each side of the peak.

35 Claims, 7 Drawing Sheets

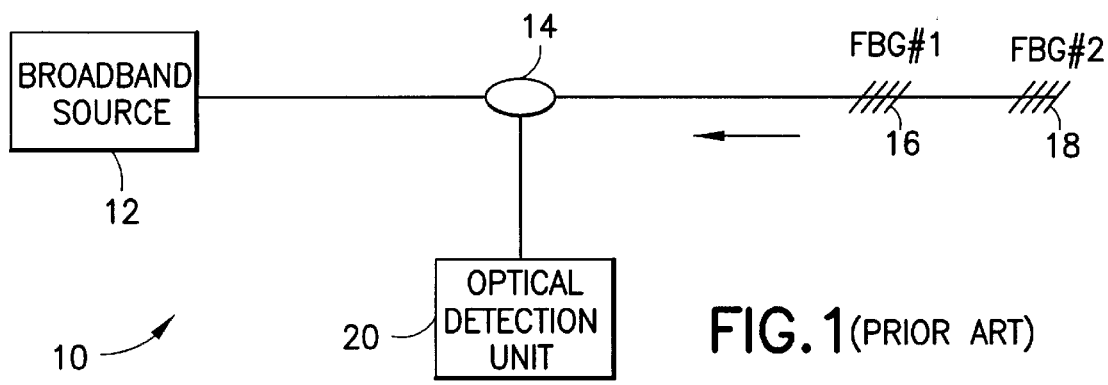
FIG. 1 (PRIOR ART)
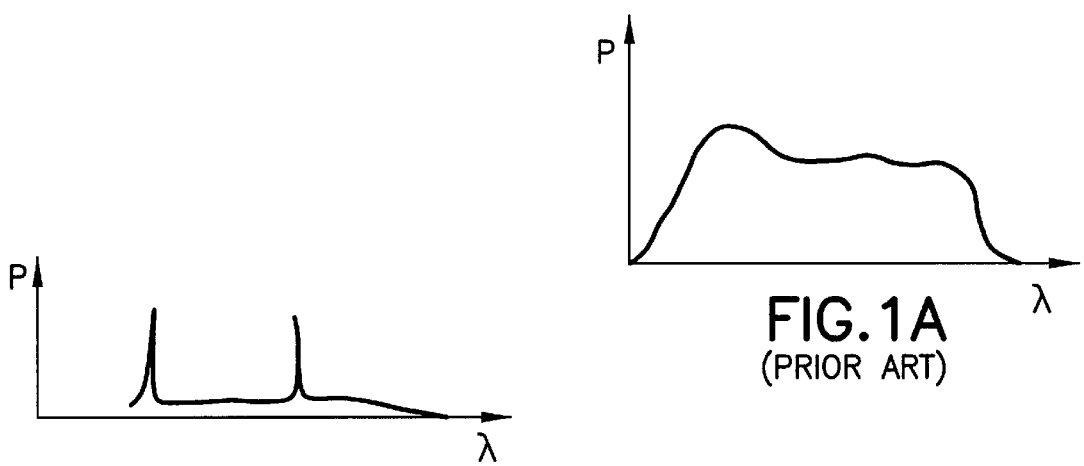
FIG. 1A (PRIOR ART)
FIG. 1B (PRIOR ART)
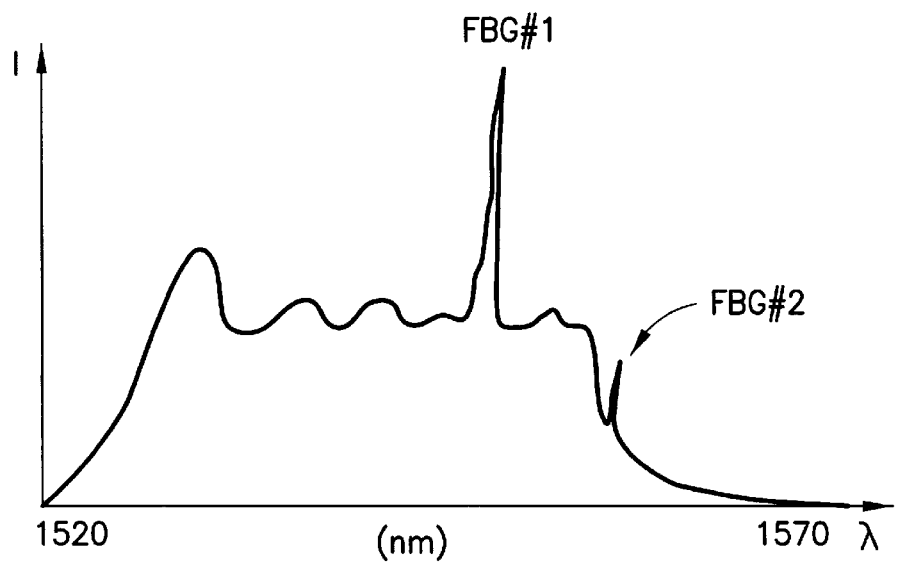
FIG. 1C (PRIOR ART)

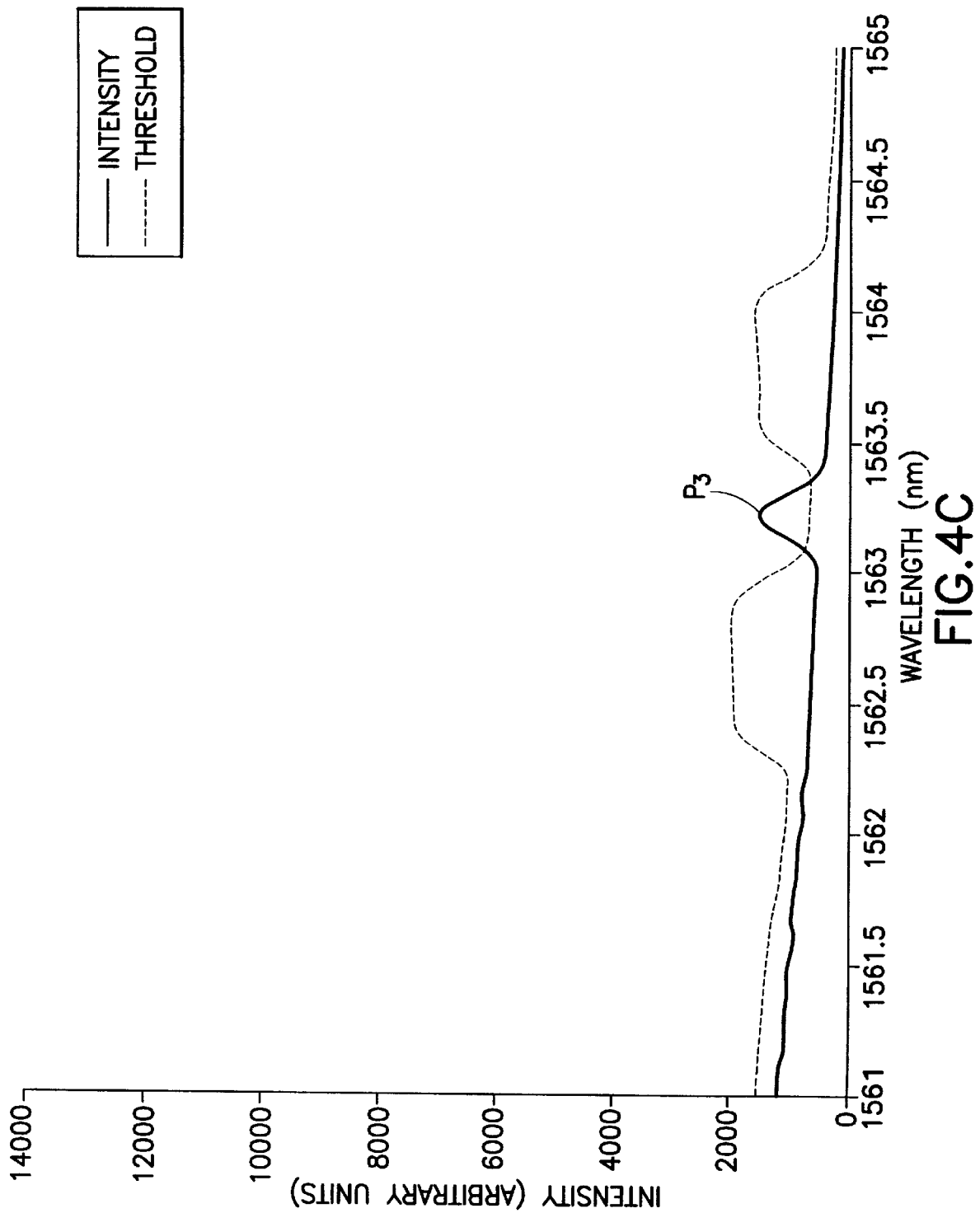

FIBER BRAGG GRATING PEAK DETECTION SYSTEM AND METHOD

BACKGROUND OF INVENTION

1. Technical Field

The present invention relates to a system for detecting optical signals reflected off a fiber Bragg grating; and more particularly, to a detection system for sensing peaks in the wave formation of optical signals reflected off a fiber Bragg grating.

2. Description of Related Art

Fiber Bragg gratings (FBGs) have been utilized in a variety of applications, including the use of FBGs as sensors. When configured as a sensor, a wide variety of optical configurations can be used to read the spectral information from the FBG.

FIG. 1 shows a fiber Bragg grating sensor system generally indicated as 10, having a broadband source 12, a coupler 14, a first FBG 16, a second FBG 18 and an optical detection unit 20. The broadband source 12 provides a broadband optical light that covers the resonance wavelengths of the FBGs 16, 18.

In operation, the broadband source 12 illuminates the FBGs of interest. The FBGs provide reflected optical signals containing reflected spectral information that is then directed by the coupler 12 into the optical detection unit 20, which performs an optical-to-electrical signal conversion and is responsible for determining each of the wavelengths reflected by the FBGs 16, 18.

FIG. 1C shows a typical return spectrum from the two FBGs 16, 18. Several techniques for optical detection have been developed including methods which effectively read the optical spectrum range of interest and present this information for processing. Also present on the return spectrum is an overall background signal which can be present in the returned spectra when reflections are present in the optical path. Once this spectra is detected, the FBG peaks can be identified and the wavelength of each FBG reflected signal calculated. However, as shown, a background signal will be present in the returned spectra often due to optical connectors, splices or imperfections in the FBG itself. Also, small Fabry-Perot cavities can create modulations on the reflected signals which can appear to be very similar to the reflections from the FBG sensors of interest. These background and unwanted signals can often make it very difficult for a system to determine the location of a valid FBG signal from the unwanted background signals. Because of this, a fixed threshold cannot be accurately used across the entire wavelength band due to potential back-reflected spectral signals, as shown in FIG 1C.

SUMMARY OF INVENTION

The present invention provides a method and apparatus for detecting a valid FBG signal on a returned optical spectra.

The apparatus includes a fiber Bragg grating peak detection system having a fiber Bragg grating parameter sensing and detecting system in combination with a variable threshold or grating profile peak detection unit.

The fiber Bragg grating parameter sensing and detecting system responds to a physical parameter, such as pressure or temperature depending on the application, for providing a fiber Bragg grating parameter sensing and detecting signal containing information about the physical parameter being sensed.

The variable threshold or grating profile peak detection unit responds to the fiber Bragg grating parameter sensing and detecting signal, for providing a variable threshold or grating profile peak detection unit signal containing information about a peak detected in the fiber Bragg grating parameter sensing and detecting signal that is used to determine the physical parameter.

In particular, the fiber Bragg grating parameter sensing and detecting system includes a broadband source, a coupler, one or more fiber Bragg gratings, and an optical detection unit. The broadband source provides a broadband optical signal via the coupler to the one or more fiber Bragg gratings. The one or more fiber Bragg gratings respond to the broadband optical signal, and further responds to a physical parameter, including temperature or pressure, for providing a fiber Bragg grating optical signal containing information about the parameter via the coupler to the optical detection unit. The information communicated in the fiber Bragg grating optical signal is in the form of one or more peaks associated with one or more wavelengths. The optical detection unit responds to the fiber Bragg grating optical signal, for providing an optical detection unit signal.

The variable threshold or grating profile peak detection unit detects one or more peaks using either a variable threshold peak detection or a grating profile peak detection, or a combination thereof. During the variable threshold peak detection, the variable threshold or grating profile peak detection unit determines a respective local threshold value for each wavelength over a spectral band of the fiber Bragg grating optical signal. During the grating profile peak detection, the variable threshold or grating profile peak detection unit determines whether there is a grating profile by looking at the points on each side of the local peak.

The foregoing and other objects, features and advantages of the present invention will become more apparent in light of the following detailed description of exemplary embodiments thereof, as illustrated in the accompanying drawing, which are not drawn to scale.

BRIEF DESCRIPTION OF THE DRAWING

FIG. 1 is a diagram of a fiber Bragg grating peak detection system that is known in the art.

FIG. 1A is a diagram of a graph of wavelength (nanometers) versus intensity (arbitrary units) of a broadband signal generated by a broadband source in FIG. 1.

FIG. 1B is a diagram of a graph of wavelength (nanometers) versus intensity (arbitrary units) of reflected signals from FBGs in FIG. 1.

FIG. 1C is a diagram of a graph of wavelength (nanometers) versus intensity (arbitrary units) of a return spectrum from two fiber Bragg gratings.

FIG. 4C is a magnified part of the graph shown in FIG. 4A between a range of wavelengths from 1561 to 1565 nanometers.

DETAILED DESCRIPTION OF THE INVENTION

The Basic Operation

The method and apparatus of the present invention provides a two stage peak detection approach. Each peak detection approach is valid on its own and could suffice as the only peak detection process. The two stage process, however, gives an added level of security for assuring that a true FBG peak is found by the algorithm.

Figure 2A:
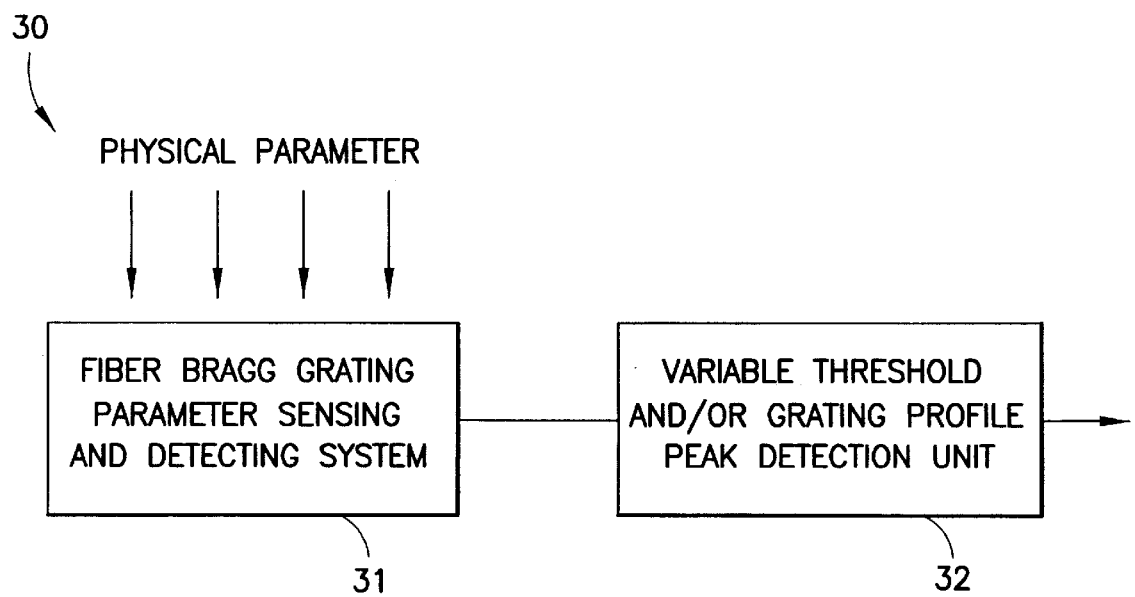
FIG. 2A shows a block diagram of a fiber Bragg grating peak detection system that is the subject matter of the present invention.

FIG. 2A shows the present invention in its broadest sense as a fiber Bragg grating peak detection system 30 that includes a fiber Bragg grating parameter sensing and detecting system generally indicated as 31 in combination with a variable threshold or grating profile peak detection unit generally indicated as 32.

As shown, the fiber Bragg grating parameter sensing and detecting system 31 responds to a physical parameter, such as pressure or temperature depending on the application, for providing a fiber Bragg grating parameter sensing and detecting signal containing information about the physical parameter being sensed.

The variable threshold or grating profile peak detection unit 32 responds to the fiber Bragg grating parameter sensing and detecting signal, for providing a variable threshold or grating profile peak detection unit signal containing information about one or more peaks detected in the fiber Bragg grating parameter sensing and detecting signal that is used to determine the physical parameter being measured.

The fiber Bragg grating peak detection system 30 is shown and described below in more detail in relation to FIGS. 2B and 2C.

Figure 2C:
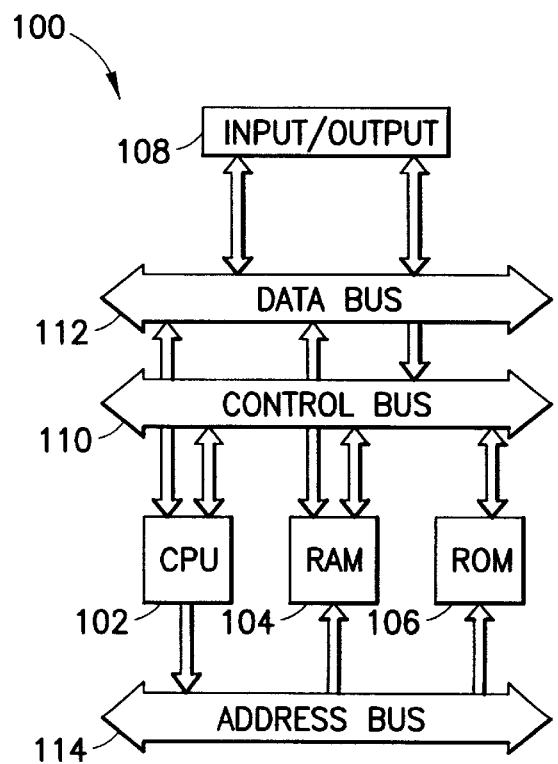
FIG. 2C shows a block diagram of a typical microprocessor circuit used in the fiber Bragg Grating peak detection system shown in FIG. 2B.
Figure 2B:
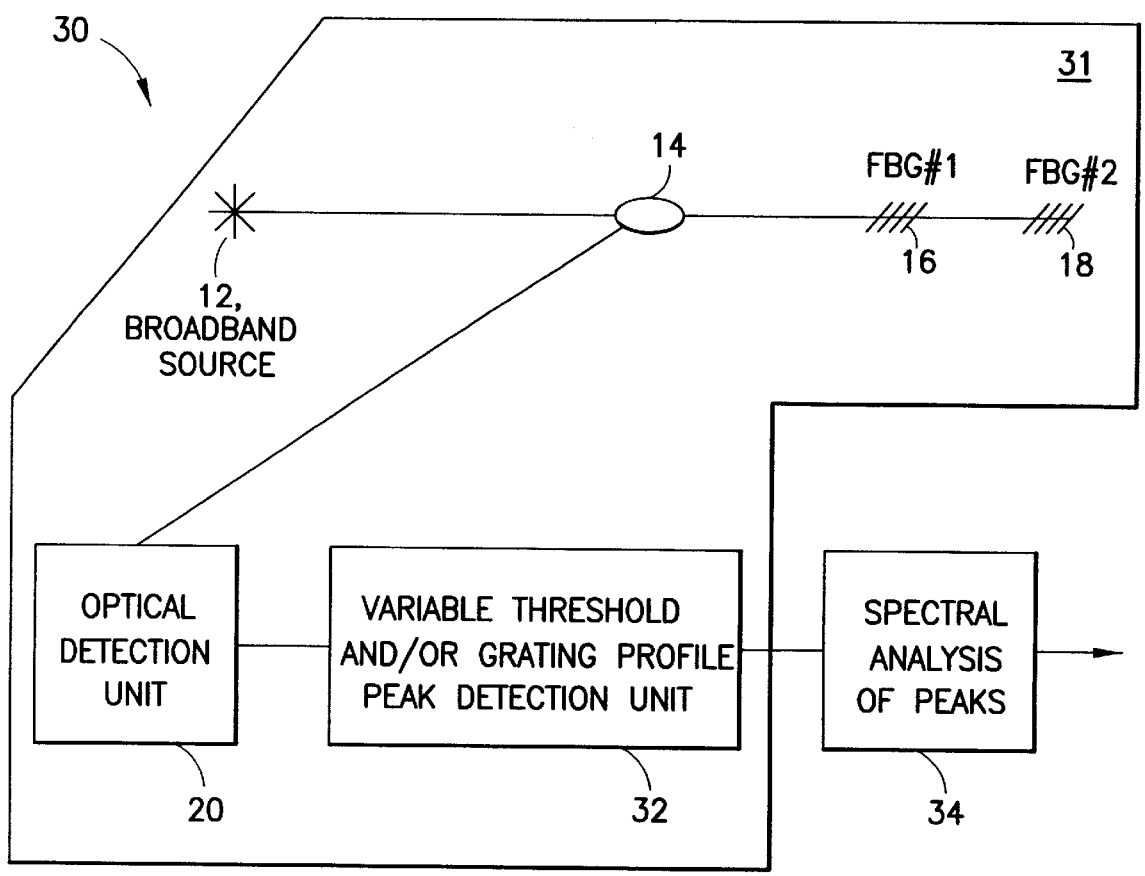
FIG. 2B shows a more detailed block diagram of the fiber Bragg grating peak detection system shown in FIG. 2A.

FIG. 2B: Fiber Bragg Grating Peak Detection System 30

FIG. 2B shows in more detail the fiber Bragg grating peak detection system 30 for detecting a valid FBG signal on a returned optical spectra. As shown, the system 30 includes the fiber Bragg grating parameter sensing and detecting system 31, the variable threshold or grating profile peak detection unit 32 and a spectral analysis device 34 of peaks.

The fiber Bragg grating parameter sensing and detecting system 31 includes a broadband source 12, a coupler 14, one or more fiber Bragg gratings 16, 18 and an optical detection unit 20. Similar elements in FIGS. 1 and 2B are labelled with similar reference numerals.

The broadband source 12 includes a narrow source swept over a broad band, and provides a broadband optical signal via the coupler 14 to the one or more fiber Bragg gratings 16, 18. The broadband source 12 is known in the art and the scope of the invention is not intended to be limited to any particular type thereof.

The one or more fiber Bragg gratings 16, 18 responds to the broadband optical signal, and further responds to a physical parameter, including pressure or temperature, for providing a fiber Bragg grating optical signal containing information about the parameter via the coupler 14 to the optical detection unit 20. The information communicated by the fiber Bragg grating optical signal is in the form of the peak associated with each fiber Bragg grating wavelength. The fiber Bragg gratings 16, 18 are known in the art and the scope of the invention is not intended to be limited to any particular type thereof.

The optical detection unit 20 responds to the fiber Bragg grating optical signal, performs an optical-to-electrical signal conversion, and provides an optical detection unit signal. The optical detection unit 20 is known in the art and the scope of the invention is not intended to be limited to any particular type thereof.

The variable threshold or grating profile peak detection unit 32 responds to the optical detection unit signal, for providing a variable threshold or grating profile peak detection unit signal containing information about the one or more peaks detected in the fiber Bragg grating optical signal that is used to determine the physical parameter being measured.

The variable threshold or grating profile peak detection unit 32 detects the one or more peaks using either a variable threshold peak detection or a grating profile peak detection, or a combination thereof. The variable threshold or grating profile peak detection unit 32 includes a microprocessor-based architecture shown and described below in relation to FIG. 2C for implementing the variable threshold detection and/or the grating profile peak detection using software.

In a first stage discussed in more detail below, during the variable threshold peak detection, the unit 32 functions as a variable threshold peak detection unit 32 that determines a respective local threshold value for each wavelength over a spectral band of the fiber Bragg grating optical signal. The local threshold value is a combination of an underlying DC component of a background signal associated with the fiber Bragg grating optical signal at the respective local wavelength and a factor of a standard deviation of local noise at the respective local wavelength. The variable threshold peak detection unit 32 determines the DC component of the background signal by performing two running averages along the spectral trace. The running average includes a forward running average offset before the peak and a reverse running average offset after the peak. The local threshold value includes an overall minimum level term which is comparable to the noise level of the variable threshold peak detection unit 32. The variable threshold peak detection unit 32 determines the local threshold value by the following equation (1):

$$[(\text{forward}_{13}\text{run}_{13}\text{avg}(-\text{offset})+\text{back}_{13}\text{run}_{13}\text{avg}(+\text{offset}))/2]+ \\ [N^*(\text{forward}_{13}\text{stdev}(-\text{offset})+\text{back}_{13}\text{stdev}(+\text{offset}))/2]+ \\ \text{min}_{13}\text{level},$$

where the +/−offsets are locations before/after the point being measured.

In a second stage discussed in more detail below, during the grating profile peak detection, the unit 32 functions as a grating profile peak detection unit 32 that determines a grating profile on each side of the peak. The grating profile peak detection unit 32 checks each local threshold value to assure that on either side of the peak the intensity decreases with each consecutive value. The grating profile peak detection unit 32 checks each local threshold value over a section of the peak that is approximately equal to a width of the fiber Bragg grating.

The spectral analysis device 34 responds to the variable threshold or grating profile peak detection unit signal and determines the wavelength of the peaks using a centroid algorithm. The wavelength is then used to determine the physical parameter such as the temperature or pressure depending on the particular application.

FIG. 2C: The Microprocessor-based Circuitry 100

The variable threshold and grating profile peak detection unit 32 may be implemented using a microprocessor-based circuitry 100 generally shown in FIG. 2C. The microprocessor-based circuitry 100 has a combination of a central processor (microprocessor) 102, a random access memory 104, a read only memory 106, an input/output device 108 and an address, control and data bus generally indicated as 110, 112, 114 for connecting the combination. The microprocessor-based circuitry 100 in FIG. 2C is shown by way of example, and the scope of the invention is not intended to be limited to any particular configuration of microprocessor-based circuitry. The scope of the invention is not intended to be limited to any particular implementation of the variable threshold and grating profile peak detection unit 32 or the combination of hardware and software to effect such an implementation. In view of more detailed design parameters set forth below, a person skilled in the art could implement without undue experimentation the variable threshold and grating profile peak detection unit 32 using a combination of hardware and software.

The First Stage: Variable Local Thresholds

In operation, the first stage of peak detection is based on the use of a local variable threshold, where, if the optical spectrum ever peaks above the threshold, a flag is set which indicates that a peak is detected. According to the present invention, the local threshold value is calculated for each wavelength over the spectral band. The local variable threshold value is the combination of the underlying DC component of the background signal and the factor of the standard deviation of the local noise to that location. The DC component of the background signal is determined by performing two running averages along the spectral trace, which results in a threshold number used that will still maintain the overall shape of the background signal while also averaging out the small features. A running average span that is about 4 times the Full Width at Half Maximum (FWHM) of the FBG signals should average out oscillations and features which are potential peaks but still maintain the background shape.

Figure 3A:
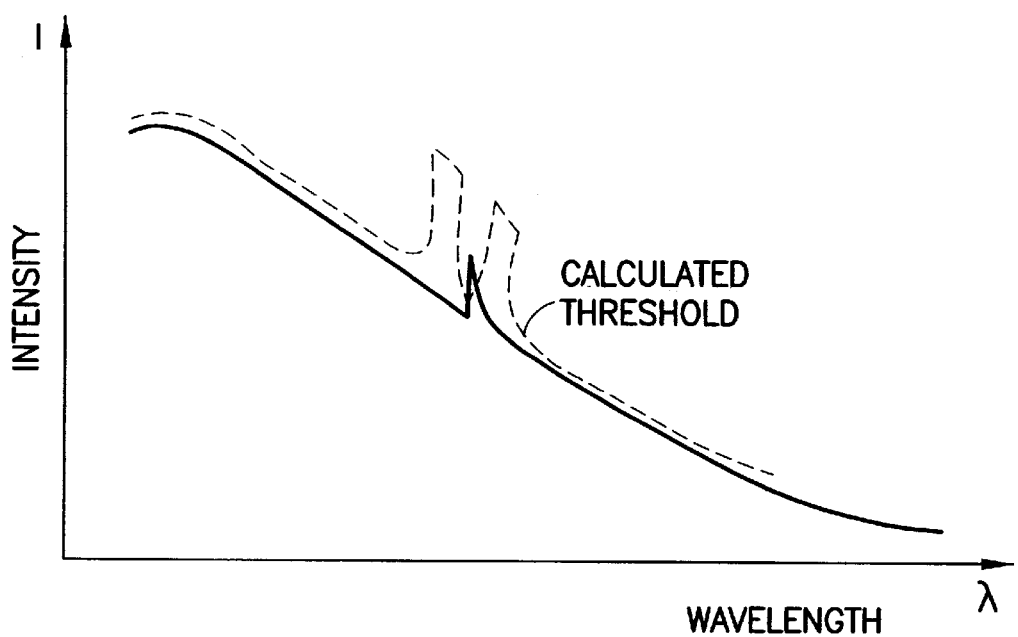
FIGS. 3A, 3B are diagrams of two graphs of a wavelength (nanometers) versus intensity (arbitrary units) of a return spectrum from two fiber Bragg gratings and an intensity threshold (arbitrary units).

If one then takes the case of a FBG peak on a steep slope of the background signal, as shown in FIG. 3A, one can see that a single forward running average will not work since the running average for the values on the high side of the peak will outweigh the peak itself. However, by also taking a running average in the reverse direction and averaging this term with the component in the forward direction, this problem is corrected.

In this calculation, the running average points used should be points which are derived for locations offset before (−) and after (+) the peak to assure that the overall threshold term does not match the FBG itself and prevent peak detection.

Figure 3B:
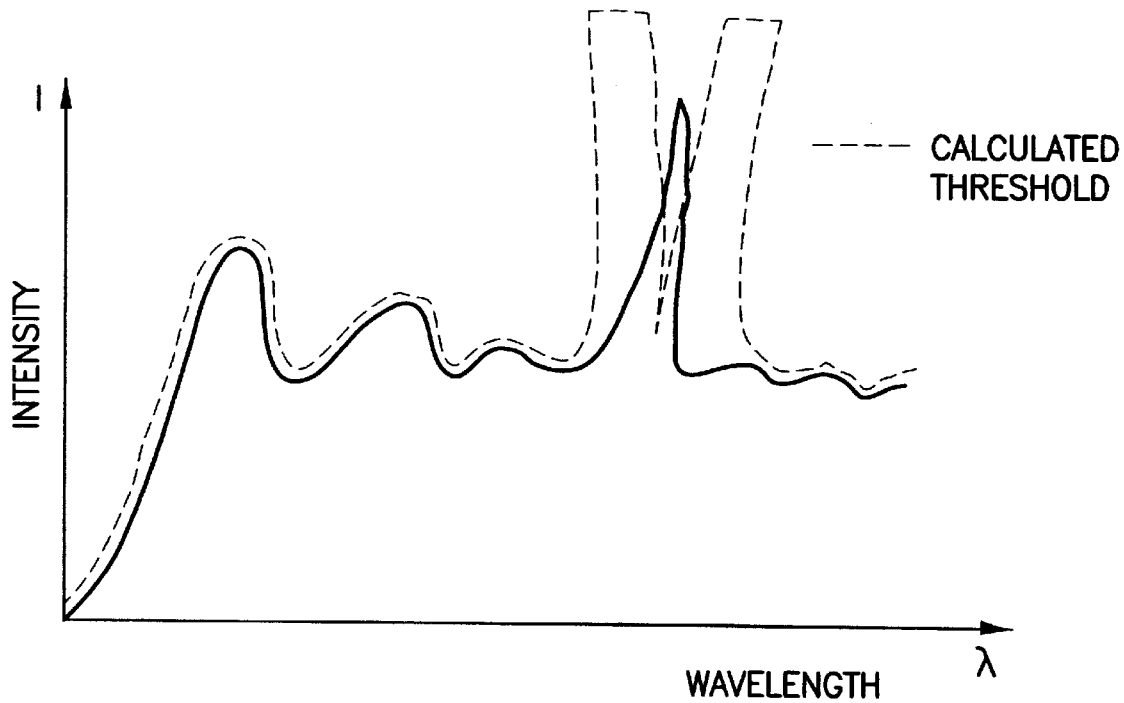

FIGS. 3A, 3B shows what an ideal threshold would be for a sample FBG signal. The dashed lines in FIGS. 3A, 3B represent the intensity of calculated local variable thresholds, and the solid lines represent the intensity of the fiber optic Bragg grating signal with some "background" signal. Note that the local variable threshold is located just above the background signal except in the region of a FBG signal, where the local variable threshold is relatively high except for a window located directly over the FBG. This window is a function of the offset used in the average calculations and the set of points used for each running average. The offset should be constant with the number of points used in the running average, a value of ½ the average points will permit the window to dip sufficiently low in the middle of a grating profile to consistently detect the signal.

The factor of the standard deviation of the local noise to that location is determined using the same operation with standard deviation calculations. An additional multiplication term (N) is used to amplify the standard deviation term dependent on the noise present on the back-reflected signal. The additional multiplication term (N) will depend on the particular system in use. It also could change with the different gain settings possible on the optical detection system.

In addition, an overall minimum level term can be used which is comparable to the noise level of the variable threshold and grating profile peak detection unit 32 (FIG. 2B).

The equation for determining the local variable threshold value for each wavelength is set forth above.

This threshold stage will permit the detection of peaks which are extremely small and are almost vanishing into the noise or structures on the spectral profile.

Figure 4A:
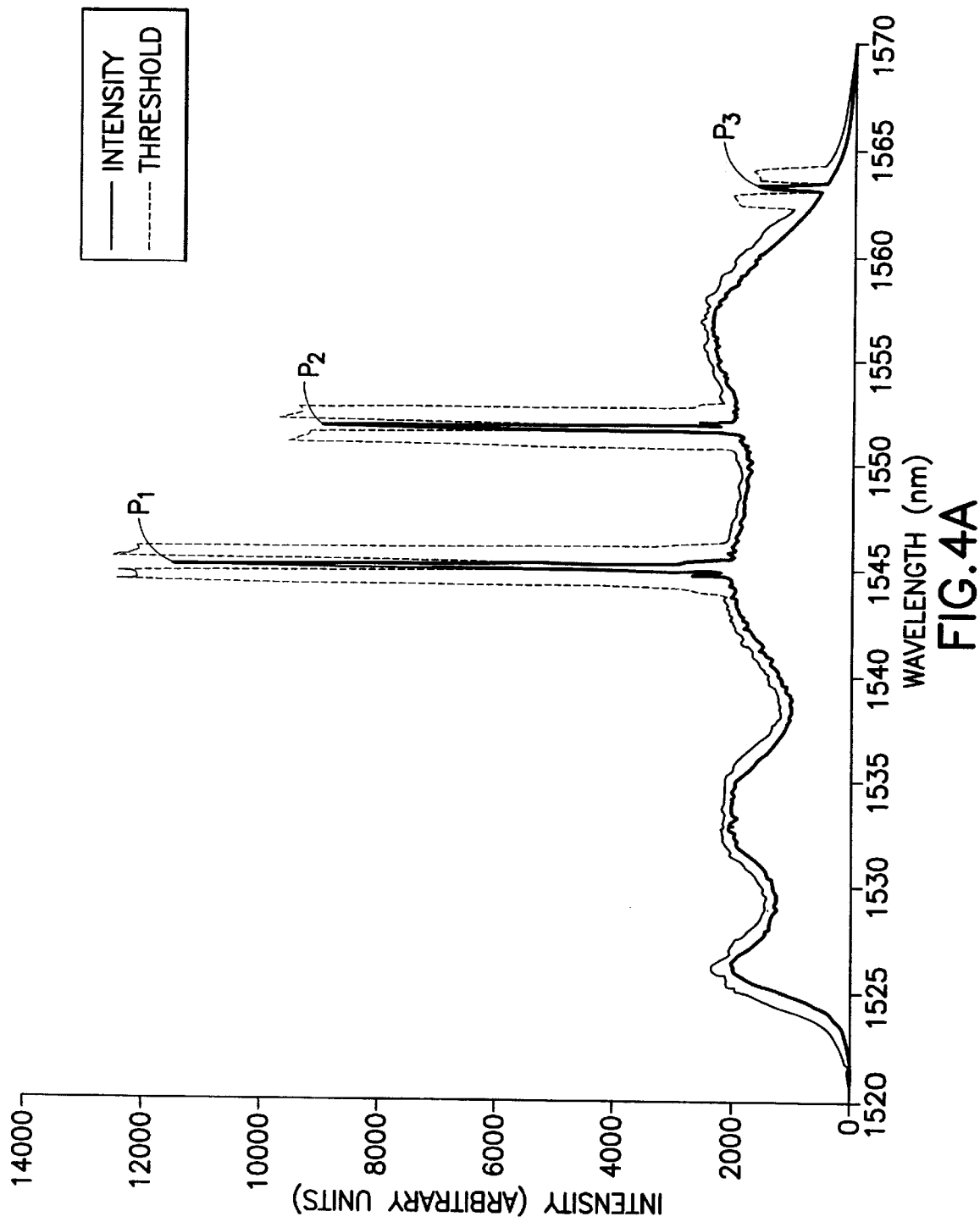
FIG. 4A is a graph of a wavelength (nanometers) versus intensity (arbitrary units) of a return spectrum from two fiber Bragg gratings and an intensity threshold (arbitrary units).

FIG. 4A is a graph of wavelength (nanometers) versus intensity (arbitrary units) of a return spectrum from two fiber Bragg gratings with some background spectrum and an intensity threshold (arbitrary units). The dashed lines in FIG. 4A represent the intensity of calculated local variable thresholds, and the solid lines represent the intensity of the fiber optic Bragg grating signal. FIG. 4A shows three peaks $P_1$, $P_2$, $P_3$.

Figure 4B:
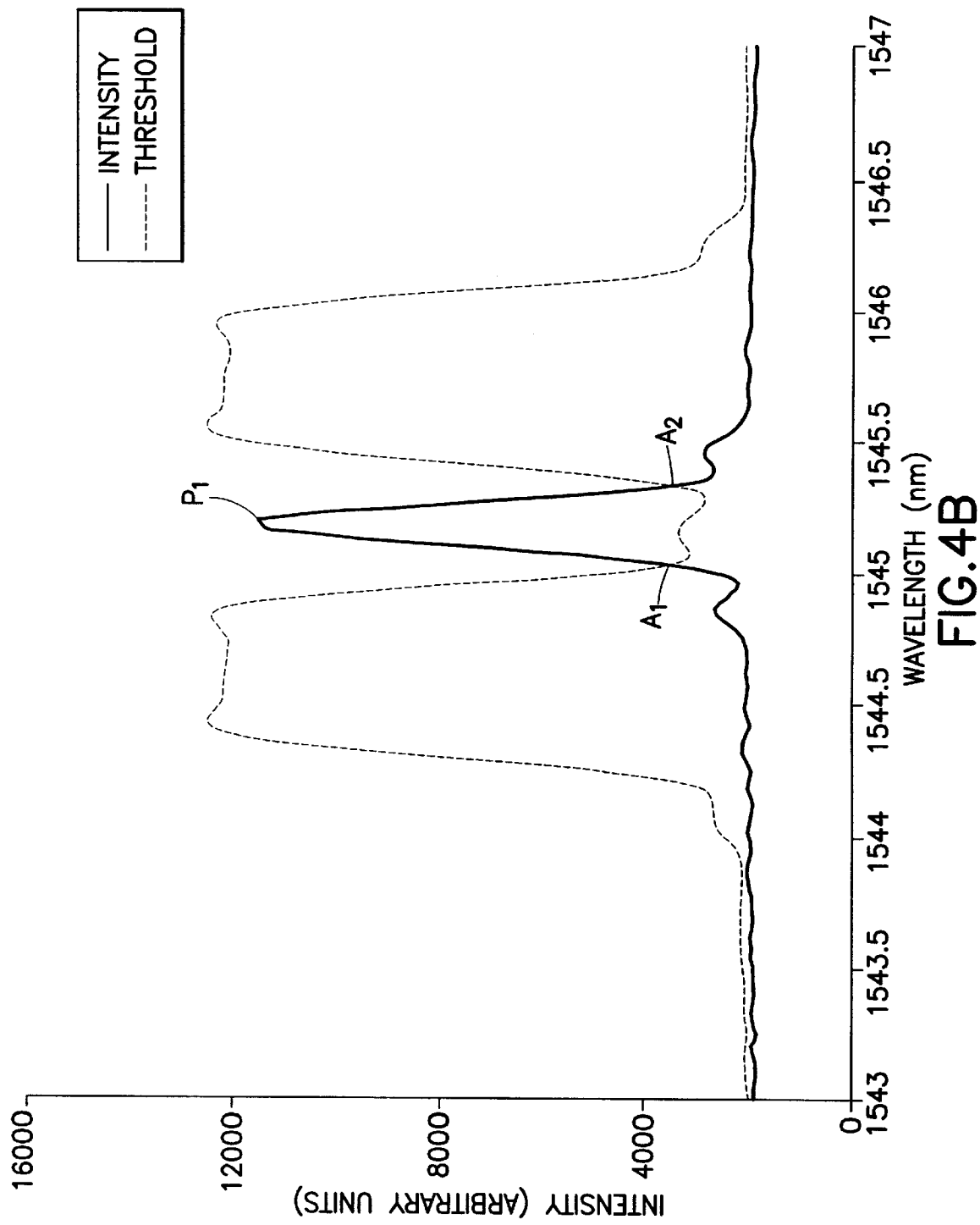
FIG. 4B is a magnified part of the graph shown in FIG. 4A between a range of wavelengths from 1543 to 1547 nanometers.

FIG. 4B is a magnified part of the graph shown in FIG. 4A between a range of wavelengths from 1543 to 1547 nanometers. FIG. 4B shows the intensity of the local variable threshold and the fiber optic Bragg grating signal in relation to peak $P_1$.

Table A shows a set of data points for the detection of peak $P_1$ in FIGS. 4A and 4B, including a wavelength, an intensity, a forward running average, a backward running average, a forward standard deviation, a backward standard deviation, and a threshold. The set of data points is for a term N=5 and a minimum level of 10.

TABLE A

| Wavelength | Intensity | Forward running average | Backward running average | Forward stdev | Backward stdev | Threshold |
|---|---|---|---|---|---|---|
| 1543.52 | 1935.60 | 1842.35 | 1984.74 | 40.79 | 35.25 | 2113.65 |
| 1543.55 | 1950.53 | 1847.18 | 1987.09 | 39.03 | 36.89 | 2116.94 |
| 1543.58 | 1953.23 | 1854.47 | 1985.49 | 36.97 | 36.14 | 2112.74 |
| 1543.61 | 1955.03 | 1861.22 | 1984.40 | 37.67 | 35.82 | 2116.53 |
| 1543.64 | 1932.24 | 1866.70 | 1986.97 | 39.72 | 36.94 | 2128.49 |
| 1543.67 | 1909.78 | 1871.11 | 1990.57 | 40.47 | 37.93 | 2136.84 |
| 1543.69 | 1931.10 | 1873.98 | 1994.02 | 40.14 | 36.92 | 2136.64 |
| 1543.72 | 1941.64 | 1877.42 | 1996.38 | 39.49 | 35.64 | 2134.74 |
| 1543.75 | 1927.00 | 1882.51 | 1997.24 | 37.67 | 35.68 | 2133.25 |
| 1543.78 | 1942.63 | 1888.54 | 1998.84 | 33.01 | 36.30 | 2126.96 |
| 1543.81 | 1986.32 | 1895.07 | 2001.71 | 28.20 | 35.50 | 2117.63 |
| 1543.84 | 2018.63 | 1900.59 | 2005.45 | 27.66 | 31.61 | 2111.19 |
| 1543.87 | 2005.76 | 1903.91 | 2009.77 | 29.82 | 27.69 | 2110.62 |
| 1543.89 | 1975.04 | 1906.72 | 2013.99 | 31.90 | 28.82 | 2122.16 |
| 1543.92 | 1962.52 | 1910.09 | 2020.75 | 30.77 | 38.10 | 2147.60 |
| 1543.95 | 1947.39 | 1912.61 | 2035.18 | 28.38 | 65.35 | 2218.22 |
| 1543.98 | 1952.99 | 1916.02 | 2060.60 | 26.10 | 114.95 | 2350.94 |
| 1544.01 | 1989.74 | 1920.16 | 2093.22 | 22.92 | 169.40 | 2497.49 |
| 1544.04 | 1995.20 | 1921.39 | 2122.80 | 22.58 | 204.78 | 2600.50 |
| 1544.07 | 1962.03 | 1923.03 | 2143.78 | 22.88 | 218.98 | 2648.06 |
| 1544.10 | 1933.01 | 1928.82 | 2156.00 | 23.55 | 220.81 | 2663.30 |
| 1544.12 | 1938.88 | 1935.79 | 2165.07 | 28.26 | 219.23 | 2679.14 |
| 1544.15 | 1976.82 | 1940.40 | 2185.68 | 31.75 | 220.95 | 2704.78 |
| 1544.18 | 1993.44 | 1942.70 | 2236.63 | 32.53 | 281.22 | 2884.04 |
| 1544.21 | 1976.43 | 1944.20 | 2345.02 | 32.73 | 515.86 | 3526.10 |
| 1544.24 | 1960.80 | 1945.59 | 2545.09 | 32.22 | 967.39 | 4754.36 |
| 1544.27 | 1976.20 | 1948.40 | 2855.30 | 30.12 | 1585.91 | 6451.91 |
| 1544.30 | 2024.82 | 1952.74 | 3262.73 | 29.47 | 2258.70 | 8338.16 |

TABLE A-continued

| Wavelength | Intensity | Forward running average | Backward running average | Forward stdev | Backward stdev | Threshold |
|---|---|---|---|---|---|---|
| 1544.33 | 2059.66 | 1956.61 | 3731.17 | 29.72 | 2872.63 | 10109.76 |
| 1544.35 | 2059.04 | 1958.72 | 4204.37 | 28.44 | 3321.56 | 11466.55 |
| 1544.38 | 2033.39 | 1958.59 | 4616.42 | 28.56 | 3540.23 | 12219.48 |
| 1544.41 | 1986.70 | 1958.01 | 4927.36 | 28.85 | 3572.01 | 12454.85 |
| 1544.44 | 1983.85 | 1959.19 | 5131.73 | 29.13 | 3513.68 | 12412.47 |
| 1544.47 | 2026.45 | 1961.11 | 5245.43 | 30.09 | 3445.22 | 12301.54 |
| 1544.50 | 2034.47 | 1963.32 | 5298.87 | 29.47 | 3402.35 | 12220.65 |
| 1544.53 | 2016.40 | 1965.87 | 5322.07 | 26.67 | 3382.10 | 12175.89 |
| 1544.56 | 2000.22 | 1968.12 | 5329.91 | 25.45 | 3375.31 | 12160.93 |
| 1544.58 | 2006.90 | 1972.28 | 5333.38 | 27.60 | 3372.43 | 12162.90 |
| 1544.61 | 2027.19 | 1978.92 | 5344.27 | 31.77 | 3363.53 | 12159.84 |
| 1544.64 | 2019.59 | 1984.74 | 5360.37 | 35.25 | 3349.84 | 12145.26 |
| 1544.67 | 2007.77 | 1987.09 | 5373.95 | 36.89 | 3337.32 | 12126.05 |
| 1544.70 | 2025.20 | 1985.49 | 5380.45 | 36.14 | 3330.97 | 12110.73 |
| 1544.73 | 2061.36 | 1984.40 | 5370.08 | 35.82 | 3341.04 | 12129.39 |
| 1544.76 | 2128.57 | 1986.97 | 5323.72 | 36.94 | 3381.80 | 12212.21 |
| 1544.79 | 2265.08 | 1990.57 | 5213.70 | 37.93 | 3455.47 | 12345.62 |
| 1544.81 | 2469.21 | 1994.02 | 5010.98 | 36.92 | 3522.97 | 12412.21 |
| 1544.84 | 2628.53 | 1996.38 | 4700.81 | 35.64 | 3498.52 | 12194.00 |
| 1544.87 | 2616.44 | 1997.24 | 4294.30 | 35.68 | 3298.80 | 11491.98 |
| 1544.90 | 2479.28 | 1998.84 | 3824.59 | 36.30 | 2879.59 | 10211.44 |
| 1544.93 | 2303.37 | 2001.71 | 3348.22 | 35.50 | 2267.60 | 8442.73 |
| 1544.96 | 2214.76 | 2005.45 | 2934.79 | 31.61 | 1595.02 | 6546.69 |
| 1544.99 | 2399.00 | 2009.77 | 2625.61 | 27.69 | 1005.71 | 4911.18 |
| 1545.02 | 3002.78 | 2013.99 | 2423.36 | 28.82 | 587.26 | 3768.89 |
| 1545.04 | 4194.37 | 2020.75 | 2309.13 | 38.10 | 382.16 | 3225.58 |
| 1545.07 | 6035.82 | 2035.18 | 2249.59 | 65.35 | 324.94 | 3128.12 |
| 1545.10 | 8220.47 | 2060.60 | 2211.69 | 114.95 | 309.93 | 3208.36 |
| 1545.13 | 10148.93 | 2093.22 | 2178.38 | 169.40 | 298.66 | 3315.95 |
| 1545.16 | 11375.74 | 2122.80 | 2141.06 | 204.78 | 276.11 | 3344.17 |
| 1545.19 | 11491.08 | 2143.78 | 2096.97 | 218.98 | 225.31 | 3241.10 |
| 1545.22 | 10260.63 | 2156.00 | 2055.82 | 220.81 | 153.69 | 3052.17 |
| 1545.25 | 8226.64 | 2165.07 | 2026.62 | 219.23 | 93.61 | 2887.94 |
| 1545.28 | 6112.49 | 2185.68 | 2008.37 | 220.95 | 56.60 | 2800.90 |
| 1545.30 | 4335.33 | 2236.63 | 1997.21 | 281.22 | 37.22 | 2923.01 |
| 1545.33 | 3197.54 | 2345.02 | 1991.80 | 515.86 | 32.85 | 3550.20 |
| 1545.36 | 2729.03 | 2545.09 | 1991.64 | 967.39 | 32.85 | 4778.98 |
| 1545.39 | 2625.94 | 2855.30 | 1992.97 | 1585.91 | 32.95 | 6481.28 |
| 1545.42 | 2697.93 | 3262.73 | 1991.61 | 2258.70 | 32.46 | 8365.07 |
| 1545.45 | 2834.32 | 3731.17 | 1989.30 | 2872.63 | 32.08 | 10132.00 |
| 1545.48 | 2801.24 | 4204.37 | 1988.25 | 3321.56 | 32.68 | 11491.91 |
| 1545.51 | 2574.92 | 4616.42 | 1987.62 | 3540.23 | 33.30 | 12245.85 |
| 1545.53 | 2344.70 | 4927.36 | 1985.77 | 3572.01 | 34.05 | 12481.73 |
| 1545.56 | 2191.75 | 5131.73 | 1981.25 | 3513.68 | 32.00 | 12430.70 |
| 1545.59 | 2075.49 | 5245.43 | 1975.09 | 3445.22 | 25.75 | 12297.70 |
| 1545.62 | 1993.98 | 5298.87 | 1969.45 | 3402.35 | 20.05 | 12200.16 |
| 1545.65 | 1981.43 | 5322.07 | 1964.71 | 3382.10 | 21.91 | 12163.40 |
| 1545.68 | 2017.12 | 5329.91 | 1961.10 | 3375.31 | 26.31 | 12159.56 |
| 1545.71 | 2018.62 | 5333.38 | 1958.52 | 3372.43 | 28.85 | 12159.14 |
| 1545.74 | 1981.61 | 5344.27 | 1956.90 | 3363.53 | 30.15 | 12144.78 |
| 1545.76 | 1963.67 | 5360.37 | 1956.55 | 3349.84 | 30.24 | 12118.66 |
| 1545.79 | 1992.14 | 5373.95 | 1956.35 | 3337.32 | 30.11 | 12093.71 |
| 1545.82 | 2042.95 | 5380.45 | 1955.63 | 3330.97 | 29.40 | 12078.95 |
| 1545.85 | 2067.58 | 5370.08 | 1953.63 | 3341.04 | 29.03 | 12097.03 |
| 1545.88 | 2050.69 | 5323.72 | 1950.20 | 3381.80 | 31.14 | 12179.32 |
| 1545.91 | 2006.67 | 5213.70 | 1946.54 | 3455.47 | 33.27 | 12311.95 |
| 1545.94 | 1971.14 | 5010.98 | 1941.80 | 3522.97 | 33.37 | 12377.23 |
| 1545.97 | 1959.71 | 4700.81 | 1936.52 | 3498.52 | 30.61 | 12151.48 |
| 1545.99 | 1951.38 | 4294.30 | 1931.76 | 3298.80 | 29.22 | 11443.07 |
| 1546.02 | 1952.68 | 3824.59 | 1926.97 | 2879.59 | 30.02 | 10159.82 |
| 1546.05 | 1978.08 | 3348.22 | 1923.58 | 2267.60 | 29.86 | 8389.56 |
| 1546.08 | 1990.92 | 2934.79 | 1920.69 | 1595.02 | 29.87 | 6499.96 |
| 1546.11 | 1979.69 | 2625.61 | 1916.01 | 1005.71 | 31.45 | 4873.71 |
| 1646.14 | 1968.73 | 2423.36 | 1910.97 | 587.26 | 33.34 | 3728.66 |
| 1546.17 | 1967.22 | 2309.13 | 1906.58 | 382.16 | 34.46 | 3159.39 |
| 1546.20 | 1990.86 | 2249.69 | 1902.75 | 324.94 | 35.05 | 2986.14 |
| 1546.23 | 2007.87 | 2211.69 | 1900.25 | 309.93 | 36.13 | 2931.13 |
| 1546.25 | 1990.05 | 2178.38 | 1898.47 | 298.66 | 37.06 | 2887.74 |
| 1546.28 | 1972.43 | 2141.06 | 1896.56 | 276.11 | 37.52 | 2812.89 |
| 1546.31 | 1960.56 | 2096.97 | 1893.45 | 225.31 | 38.13 | 2663.82 |
| 1546.34 | 1950.99 | 2055.82 | 1887.72 | 153.69 | 38.49 | 2462.22 |
| 1546.37 | 1955.27 | 2026.62 | 1880.11 | 93.61 | 35.44 | 2286.00 |
| 1546.40 | 1952.45 | 2008.37 | 1873.75 | 56.60 | 27.82 | 2162.12 |
| 1546.43 | 1944.47 | 1997.21 | 1871.23 | 37.22 | 23.47 | 2095.94 |
| 1546.46 | 1937.85 | 1991.80 | 1870.73 | 32.85 | 22.92 | 2080.70 |
| 1546.48 | 1911.86 | 1991.64 | 1869.45 | 32.85 | 22.25 | 2078.31 |
| 1546.51 | 1898.88 | 1992.97 | 1867.16 | 32.95 | 21.71 | 2076.72 |

In Table A, the detection of peak $P_1$ is determined by comparing the intensity and threshold. For example, in Table A at a wavelength of 1545.04 the intensity (4194.37) is greater than the threshold (3225.58) at a point labelled $A_1$ in FIG. 4B, which indicates the start of peak $P_1$. In Table A, at a wavelength of 1545.33 the intensity (3197.54) is less than the threshold (3550.20) at a point labelled $A_2$ in FIG. 4B, which indicates the end of peak $P_1$.

FIG. 4C is a magnified part of the graph shown in FIG. 4A between a range of wavelengths from 1561 to 1565 nanometers. FIG. 4C shows the intensity of the local variable threshold and the fiber optic Bragg grating signal in relation to peak $P_3$.

The Second Stage: Grating Profile Detection

While robust in finding peaks, the first stage may occasionally let noise peaks through the detection process. These typically take the form of a noise spike of one point located on a high reflection in the background data. To add an additional level of robustness, a second stage of detection can be implemented.

In operation, the second stage is configured to act as a grating profile detection, tied directly to the expected FWHM of the FBG reflected signals. After a peak is identified by the first stage, each location is checked to assure that on either side of the peak the intensity decreases with each consecutive value. This is performed over a section of the peak that is approximately equal to the width of the grating. A tolerance can be placed on this check to assure that greater than 90% of the consecutive values follow this condition. This final check assures that a stray noise peak is not detected as a FBG signal.

As an additional after product of this detection scheme, the data necessary to perform a source slope correction has been gathered. As shown in FIGS. 3A, 3B, the local slope of the source can influence the general weighting of an FBG reflected shape. However, a first order correction term can be determined from the DC component on either side of the FBG peak. A linear (or higher order) correction can be applied which will correct for the influence of the source. In effect, corrections for the source effects can be made by subtracting out the source slope. This can be done by calculating the source slope from two points on either side of the fiber Bragg grating. Once this is found, a small calculated value will be subtracted out of each data point that makes up the FBG profile.

SCOPE OF THE INVENTION

Although the invention has been described and illustrated with respect to exemplary embodiments thereof, the foregoing and various other additions and omissions may be made therein and thereto without departing from the spirit and scope of the present invention.

We claim:

1. An apparatus comprising:
   a broadband source for providing a broadband optical signal;
   a coupler, responsive to the broadband optical signal, for providing a coupled broadband optical signal;

a fiber Bragg grating, responsive to the broadband optical signal, and further responsive to a physical parameter, for providing a fiber Bragg grating optical signal containing information about the parameter;

the coupler responding to the fiber Bragg grating optical signal, for providing a coupled fiber Bragg grating optical signal;

an optical detection unit, responsive to the coupled fiber Bragg grating optical signal, performing an optical-to-electrical signal conversion, and providing an optical detection unit signal; and a variable threshold or grating profile peak detection unit, responsive to the optical detection unit signal, for providing a variable threshold or grating profile peak detection unit signal containing information about a peak detected in the fiber Bragg grating optical signal that is used to determine the physical parameter.

2. An apparatus according to claim 1,
wherein the variable threshold or grating profile peak detection unit detects the peak using either a variable threshold peak detection or a grating profile peak detection, or a combination thereof.

3. An apparatus according to claim 1,
wherein the variable threshold or grating profile peak detection unit includes a microprocessor-based architecture for implementing a variable threshold or grating profile peak detection using software.

4. An apparatus according to claim 2,
wherein during the variable threshold peak detection the variable threshold or grating profile peak detection unit determines a respective local threshold value for each wavelength over a spectral band of the fiber Bragg grating optical signal.

5. An apparatus according to claim 4,
wherein the local threshold value is a combination of an underlying DC component of a background signal associated with the fiber Bragg grating optical signal at the respective local wavelength and a factor of a standard deviation of local noise at the respective local wavelength.

6. An apparatus according to claim 5,
wherein the variable threshold or grating profile peak detection unit determines the DC component of the background signal by performing a running average along an entire spectral trace.

7. An apparatus according to claim 6,
wherein the running average includes a forward running average offset before the peak and a reverse running average offset after the peak.

8. An apparatus according to claim 7,
wherein the local threshold value includes an overall minimum level term which is comparable to the noise level of the variable threshold or grating profile peak detection unit.

9. An apparatus according to claim 8,
wherein the variable threshold or grating profile peak detection unit determines the local threshold value by the following equation:

$$[(\text{forward}_{13}\text{run}_{13}\text{avg}(-\text{offset}) + \text{back}_{13}\text{run}_{13}\text{avg}(+\text{offset}))/2] + [N^*(\text{forward}_{13}\text{stdev}(-\text{offset}) + \text{back}_{13}\text{stdev}(+\text{offset}))/2] + \text{min}_{13}\text{level}.$$

10. An apparatus according to claim 2,
wherein, during the grating profile peak detection, the variable threshold or grating profile peak detection unit determines a grating profile on each side of the peak.

11. An apparatus according to claim 10,
wherein the variable threshold or grating profile peak detection unit checks each local threshold value to assure that on either side of the peak the intensity decreases with each consecutive value.

12. An apparatus according to claim 11,
wherein the variable threshold or grating profile peak detection unit checks each local threshold value over a section of the peak that is approximately equal to a width of the fiber Bragg grating.

13. A method comprising the steps of:
providing a broadband optical signal with a broadband source;

responding to a physical parameter with a fiber Bragg grating, and responding to the broadband optical signal with a fiber Bragg grating, for reflecting a fiber Bragg grating optical signal containing information about the parameter; and responding to the fiber Bragg grating optical signal with a variable threshold or grating profile peak detection unit, for providing a variable threshold or grating profile peak detection unit signal containing information about a peak detected in the fiber Bragg grating optical signal that is used to determine the physical parameter.

14. A method according to claim 13,
wherein the method includes the step of detecting with the variable threshold or grating profile peak detection unit the peak in the fiber Bragg grating optical signal using either a variable threshold peak detection or a grating profile peak detection, or a combination thereof.

15. A method according to claim 13,
wherein the method includes the step of implementing with the variable threshold or grating profile peak detection unit a variable threshold or grating profile peak detection using software and a microprocessor-based architecture.

16. A method according to claim 14,
wherein the step of detecting includes, during the variable threshold peak detection, determining a respective local threshold value for each wavelength over a spectral band of the fiber Bragg grating optical signal.

17. A method according to claim 16,
wherein the step of detecting includes determining the local threshold value using a combination of an underlying DC component of a background signal associated with the fiber Bragg grating optical signal at the respective local wavelength and a factor of a standard deviation of local noise at the respective local wavelength.

18. A method according to claim 17,
wherein the step of determining includes determining the DC component of the background signal by performing a running average along an entire spectral trace.

19. A method according to claim 18,
wherein the step of performing the running average includes performing a forward running average offset before the peak and a reverse running average offset after the peak.

20. A method according to claim 19,
wherein the step of determining the local threshold value includes determining an overall minimum level term which is comparable to the noise level of the variable threshold or grating profile peak detection unit.

21. A method according to claim 20,
wherein the step of determining the local threshold value includes using the following equation:

$$[(\text{forward}_{13}\text{run}_{13}\text{avg}(-\text{offset})+\text{back}_{13}\text{run}_{13}\text{avg}(+\text{offset}))/2]+$$
$$[N*(\text{forward}_{13}\text{stdev}(-\text{offset})+\text{back}_{13}\text{stdev}(+\text{offset}))/2]+$$
$$\text{min}_{13}\text{level,}$$

where the +/− offsets are locations before/after the point being measured.

22. A method according to claim 14, wherein the step of detecting includes, during the grating profile peak detection, determining a grating profile on each side of the peak.

23. A method according to claim 22, wherein the step of determining includes checking each local threshold value to assure that on either side of the peak the intensity decreases with each consecutive value.

24. A method according to claim 23, wherein the step of checking includes checking each local threshold value over a section of the peak that is approximately equal to a width of the fiber Bragg grating.

25. A fiber Bragg grating peak detection system, comprising:

a fiber Bragg grating parameter sensing and detecting system, responsive to a physical parameter, for providing a fiber Bragg grating parameter sensing and detecting signal containing information about the physical parameter being sensed; and a variable threshold or grating profile peak detection unit, responsive to the fiber Bragg grating parameter sensing and detecting signal, for providing a variable threshold or grating profile peak detection unit signal containing information about a peak detected in the fiber Bragg grating parameter sensing and detecting signal that is used to determine the physical parameter.

26. A fiber Bragg grating peak detection system according to claim 25, wherein the variable threshold or grating profile peak detection unit detects the peak using either a variable threshold peak detection or a grating profile peak detection, or a combination thereof.

27. A fiber Bragg grating peak detection system according to claim 25, wherein the variable threshold or grating profile peak detection unit includes a microprocessor-based architecture for implementing a variable threshold or grating profile peak detection using software.

28. A fiber Bragg grating peak detection system according to claim 25, wherein during the variable threshold peak detection the variable threshold or grating profile peak detection unit determines a respective local threshold value for each wavelength over a spectral band of the fiber Bragg grating optical signal.

29. A fiber Bragg grating peak detection system according to claim 25, wherein the fiber Bragg grating parameter sensing and detecting system includes a broadband source for providing a broadband optical signal.

30. A fiber Bragg grating peak detection system according to claim 29, wherein the fiber Bragg grating parameter sensing and detecting system includes a coupler, responsive to the broadband optical signal, f or providing a coupled broadband optical signal.

31. A fiber Bragg grating peak detection system according to claim 30, wherein the fiber Bragg grating parameter sensing and detecting system includes a fiber Bragg grating, responsive to the broadband optical signal, and further responsive to a physical parameter, for providing a fiber Bragg grating optical signal containing information about the parameter.

32. A fiber Bragg grating peak detection system according to claim 31, wherein the coupler responds to the fiber Bragg grating optical signal, for providing a coupled fiber Bragg grating optical signal; and wherein the fiber Bragg grating parameter sensing and detecting system includes an optical detection unit, responsive to the coupled fiber Bragg grating optical signal, for providing an optical detection unit signal to the variable threshold or grating profile peak detection unit.

33. An apparatus according to claim 9, wherein the variable threshold or grating profile peak detection unit determines a first order correction term from the DC component on either side of the FBG peak and applies a linear (or higher order) correction which will correct for the influence of the source.

34. An apparatus according to claim 33, wherein the variable threshold or grating profile peak detection unit determines the linear correction for source effects by subtracting out a source slope.

35. An apparatus according to claim 34, wherein the variable threshold or grating profile peak detection unit determines the linear correction by calculating the source slope from two points on either side of the fiber Bragg grating and subtracts a small calculated value from each data point that makes up a fiber Bragg Grating profile.

* * * * *

UNITED STATES PATENT AND TRADEMARK OFFICE
CERTIFICATE OF CORRECTION

PATENT NO.     : 6,346,702 B1
DATED          : February 12, 2002
INVENTOR(S)    : M. Davis et al.

It is certified that error appears in the above-identified patent and that said Letters Patent is hereby corrected as shown below:

Column 4,
Lines 46-48, "sub 13's" in equation should be -- _ --.

Column 7,
Table A, Line 70, "1646.14" should be -- 1546.14 --.

Column 9,
Lines 60-62, "sub 13's" in equation should be -- _ --.

Column 11,
Lines 1-3, "sub 13's" in equation should be -- _ --.

Column 12,
Line 12, "f or" should be -- for --.

Signed and Sealed this

Eighteenth Day of March, 2003

JAMES E. ROGAN
*Director of the United States Patent and Trademark Office*